US012138886B2

(12) United States Patent
Takahashi et al.

(10) Patent No.: US 12,138,886 B2
(45) **Date of Patent: *Nov. 12, 2024**

(54) PLATED STEEL SHEET FOR HOT STAMPING

(71) Applicant: NIPPON STEEL CORPORATION, Tokyo (JP)

(72) Inventors: Takehiro Takahashi, Tokyo (JP); Daisuke Maeda, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 17/612,446

(22) PCT Filed: May 29, 2020

(86) PCT No.: PCT/JP2020/021445

§ 371 (c)(1),
(2) Date: Nov. 18, 2021

(87) PCT Pub. No.: WO2020/241866

PCT Pub. Date: Dec. 3, 2020

(65) Prior Publication Data

US 2022/0219430 A1 Jul. 14, 2022

(30) Foreign Application Priority Data

May 31, 2019 (JP) ................................ 2019-102273

(51) Int. Cl.

| | |
|---|---|
| ***B32B 15/01*** | (2006.01) |
| ***C22C 18/00*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C25D 3/56*** | (2006.01) |

(52) U.S. Cl.

CPC ............ *B32B 15/013* (2013.01); *C22C 18/00* (2013.01); *C22C 38/001* (2013.01); *C22C 38/002* (2013.01); *C22C 38/02* (2013.01); *C22C 38/04* (2013.01); *C22C 38/06* (2013.01); *C25D 3/565* (2013.01)

(58) Field of Classification Search

CPC ..... C22C 38/001; C22C 38/002; C22C 38/02; C22C 38/04; C22C 38/06; C22C 18/00; B32B 15/013

USPC ........................................................ 428/659

See application file for complete search history.

(56) References Cited

U.S. PATENT DOCUMENTS

| | | | | |
|---|---|---|---|---|
| 2013/0122322 | A1 | 5/2013 | Nakajima et al. | |
| 2013/0333436 | A1 * | 12/2013 | Nakajima ................ | C25D 5/14 72/342.1 |
| 2016/0151822 | A1 | 6/2016 | Nakajima et al. | |
| 2017/0306437 | A1 | 10/2017 | Nakagawa et al. | |
| 2019/0249268 | A1 | 8/2019 | Nakagawa et al. | |
| 2019/0309396 | A1 | 10/2019 | Kizu et al. | |

FOREIGN PATENT DOCUMENTS

| | | | | |
|---|---|---|---|---|
| EP | 2 233 610 | A1 | | 9/2010 |
| EP | 2 684 985 | A1 | | 1/2014 |
| JP | 3-68793 | A | | 3/1991 |
| JP | 6-116781 | A | | 4/1994 |
| JP | 2009-127126 | A | | 6/2009 |
| JP | 2011252182 | A | * | 12/2011 |
| JP | 2012-197505 | A | | 10/2012 |
| JP | 2012-233247 | A | | 11/2012 |
| JP | 2016-29214 | A | | 3/2016 |
| JP | 2016125101 | A | * | 7/2016 |
| JP | 2017-115191 | A | | 6/2017 |
| JP | 2017-179589 | A | | 10/2017 |
| WO | WO 2015/001705 | A1 | | 1/2015 |
| WO | WO 2015/125887 | A1 | | 8/2015 |
| WO | WO 2016/063467 | A1 | | 4/2016 |

OTHER PUBLICATIONS

Akiba et al., JP 2016125101A Google Patents machine translation printed Apr. 13, 2023, Jul. 11, 2016, entire translation (Year: 2016).*

Date et al. JP 2011252182A Google Patents machine translation printed on Feb. 9, 2024, Dec. 15, 2011, entire translation (Year: 2011).*

Made-in-China, SPP-SD CRC HRC SPCC Cold Rolled Iron Steel Sheet Steel Coil, printed on Feb. 9, 2024, pp. 1-14, URL: <https://tjemersonsteel.en.made-in-china.com/product/ZKXxRqBIMbUy/China-SPCC-SD-CRC-HRC-SPCC-Cold-Rolled-Iron-Steel-Sheet-Steel-Coil.html> (Year: 2024).*

Tozar et al., "Structural and corrosion protection properties of electrochemically deposited nano-sized Zn—Ni alloy coatings," Applied Surface Science, vol. 318, 2014 (Available online Dec. 14, 2013), pp. 15-23.

* cited by examiner

*Primary Examiner* — Katherine A Christy

(74) *Attorney, Agent, or Firm* — Birch, Stewart, Kolasch & Birch, LLP

(57) ABSTRACT

The present invention relates to a plated steel sheet for hot stamping comprising a steel sheet and a Zn—Ni plating layer formed on at least one surface of the steel sheet, wherein the Zn—Ni plating layer has an Ni concentration of 8 mass % or more, a plating deposition amount of 10 g/m$^2$ or more and 90 g/m$^2$ or less per surface, and an average grain size of 50 nm or less.

5 Claims, No Drawings

PLATED STEEL SHEET FOR HOT STAMPING

FIELD

The present invention relates to a plated steel sheet for hot stamping, more specifically a plated steel sheet for hot stamping having a Zn—Ni plating layer.

BACKGROUND

In recent years, much use has been made of hot stamping (hot pressing) for shaping steel sheet used for automobile members. "Hot stamping" is the method of press-forming a steel sheet in a state heated to a temperature of the austenite region and quenching (cooling) the sheet by the press dies at the same time as shaping. It is one of the methods of shaping steel sheet excellent in strength and dimensional precision.

In the steel sheet used for hot stamping, sometimes the surface of the steel sheet is provided with a Zn—Ni plating layer. PTL 1 discloses a steel sheet for hot stamping having a coated layer such as a Zn—Ni plating layer on a surface thereof, wherein the melting point of the coated layer is not lower than 800° C. and a coating weight of the coated layer per side is from 10 to 90 g/m$^2$. Further, PTL 2 discloses a steel sheet for hot stamping comprising a base steel sheet; and a plating layer that is formed on a surface of the base steel sheet at a coating weight of 10 to 90 g/m$^2$ and contains 10 to 25% by mass of Ni and the balance Zn with inevitable impurities, wherein an $\eta$-phase content of the plating layer is 5 mass % or less. Furthermore, PTL 3 discloses a steel sheet for hot stamping, comprising sequentially on a surface of a base steel sheet: a plating layer I containing 60% by mass or more of Ni and the remainder consisting of Zn and inevitable impurities, a coating mass thereof being 0.01 to 5 g/m$^2$; and a plating layer II containing 10 to 25% by mass of Ni and the remainder consisting of Zn and inevitable impurities, a coating mass thereof being 10 to 90 g/m$^2$. Further, PTL 4 describes a method of manufacturing a hot-pressed member comprising: heating a coated steel sheet to 850° C. to 950° C., the coated steel sheet including a substrate steel sheet and a coating layer formed on the substrate steel sheet and containing 10% to 25% by mass of Ni and the balance being Zn and incidental impurities, in which the coating weight of the coating layer is 10 to 90 g/m$^2$ per a side; and starting hot press forming when the temperature of the coated steel sheet which has been heated is 650° C. to 800° C.

Regarding the Zn—Ni plating layer, PTLs 5 to 7 respectively teach to adjust the average grain size of the plating layer to thereby stably maintain the appearance after chromate treatment, improve the press formability, and improve the chemical convertibility.

CITATIONS LIST

Patent Literature

[PTL 1] Japanese Unexamined Patent Publication No. 2012-197505

[PTL 2] Japanese Unexamined Patent Publication No. 2016-29214

[PTL 3] Japanese Unexamined Patent Publication No. 2012-233247

[PTL 4] WO2015/001705

[PTL 5] Japanese Unexamined Patent Publication No. 2009-127126

[PTL 6] Japanese Unexamined Patent Publication No. 6-116781

[PTL 7] Japanese Unexamined Patent Publication No. 3-68793

SUMMARY

Technical Problem

If applying hot stamping to a plated steel sheet having, on the surface of the steel sheet, a Zn plating layer or a Zn alloy plating layer such as a Zn—Ni plating layer, liquid metal embrittlement (below, referred to as "LME") can occur. "LME" is the phenomenon where when applying stress (for example, tensile stress) to a surface of a solid metal in the state where a liquid metal contacts it, the liquid metal will penetrate into the solid metal and the solid metal will become brittle. When applying hot stamping to a steel sheet having a Zn plating layer or Zn alloy plating layer, if the melting point of that plating layer is lower than the heating temperature of the hot stamping, the plating layer can melt and form a liquid phase at the surface of the steel sheet. For this reason, if hot stamping at such a heating temperature, the Zn in the Zn—Ni plating layer is liable to penetrate into the grain boundaries of the steel sheet resulting in the occurrence of LME. This being so, cracks (LME cracks) are liable to arise at the obtained hot stamped body.

In the steel sheet for hot stamping described in PTL 1, to obtain LME resistance, a plating layer with a melting point of 800° C. or more is provided on the steel sheet. Further, PTL 1 describes that in the case where the melting point of the plating layer is lower than the heating temperature of the hot stamping, if plating by as high a melting point metal as possible, the time during which the molten metal and base metal steel sheet contact each other will be short, therefore the liquid metal embrittlement resistance will become excellent. However, even if the melting point of the plating layer is 800° C. or more, in the case where the melting point of that plating layer is lower than the heating temperature at the time of hot stamping, melting of the plating layer at the time of the heating in the hot stamping will not be completely prevented. For this reason, at the time of the shaping in the hot stamping, the melted plating layer is liable to penetrate into the grain boundaries of the steel sheet and cause LME.

PTLs 2 and 3 disclose a steel sheet for hot stamping having a Zn—Ni plating layer on the steel sheet, but do not study suppression of LME. On the other hand, PTL 4 teaches to prevent LME cracks by starting the hot press-forming at a predetermined temperature, but does not sufficiently study the constitution of a Zn—Ni plated steel sheet for preventing LME cracks.

The present invention was made in consideration of such an actual situation and has as its object to provide a plated steel sheet for hot stamping able to prevent a Zn—Ni plating layer from melting at the time of the shaping in the hot stamping and to sufficiently suppress LME.

Solution to Problem

The inventors discovered that to sufficiently suppress LME at the time of the shaping in hot stamping, it is effective to refine the average grain size of plating at the Zn—Ni plating layer formed on the steel sheet. By making the plating one with finer grain size, at the time of the heating in the hot stamping, the Zn of the Zn—Ni plating layer enters a state where it can easily transfer and a large amount of Zn in the plating layer can diffuse to the underlying steel sheet. This being so, the Zn concentration of the plating layer is decreased, i.e., relatively, the Ni concentration of the plating layer is increased, and the melting point of that plating layer becomes higher. Further, the amount of diffusion of the Fe of the base metal steel sheet to the inside of the plating layer also increases. The melting point of that plating layer becomes higher due to the increase in the Fe concentration in the plating layer as well. For this reason, at the time of the shaping in the hot stamping, the plating layer is not present as a liquid phase. Further, the Zn diffusing to the inside of the steel sheet at the time of the heating is alloyed with the Fe in the steel sheet to become a complete solute whereby LME can be suppressed. Further, the inventors discovered that in addition to control of the average grain size, in order for the plating layer to obtain a sufficient melting point after Zn diffuses into the steel sheet, it is effective to make the Ni concentration in the plating layer before the hot stamping a predetermined value or more and further that to make it easier for the Zn to diffuse into the steel sheet, it is effective to not make the plating layer excessively thick.

The present invention was made based on this discovery and has as its gist the following:

(1) A plated steel sheet for hot stamping comprising a steel sheet and a Zn—Ni plating layer formed on at least one surface of the steel sheet, wherein the Zn—Ni plating layer has an Ni concentration of 8 mass % or more, a plating deposition amount of 10 g/$m^2$ or more and 90 g/$m^2$ or less per surface, and an average grain size of 50 nm or less.

(2) The plated steel sheet for hot stamping according to (1), wherein the steel sheet comprises, by mass %, C: 0.05% or more and 0.70% or less,
Mn: 0.5% or more and 11.0% or less,
Si: 0.05% or more and 2.00% or less,
Al: 0.001% or more and 1.500% or less,
P: 0.100% or less,
S: 0.100% or less,
N: 0.010% or less,
O: 0.010% or less,
B: 0% or more and 0.0040% or less,
Cr: 0% or more and 2.00% or less,
Ti: 0% or more and 0.300% or less,
Nb: 0% or more and 0.300% or less,
V: 0% or more and 0.300% or less,
Zr: 0% or more and 0.300% or less,
Mo: 0% or more and 2.000% or less,
Cu: 0% or more and 2.000% or less,
Ni: 0% or more and 2.000% or less,
Sb: 0% or more and 0.100% or less,
Ca: 0% or more and 0.0100% or less,
Mg: 0% or more and 0.0100% or less,
REM: 0% or more and 0.1000% or less, and
a balance of iron and impurities.

(3) The plated steel sheet for hot stamping according to (2), wherein the steel sheet comprises, by mass %, at least one selected from the group consisting of B: 0.0005% or more and 0.0040% or less,
Cr: 0.01% or more and 2.00% or less,
Ti: 0.001% or more and 0.300% or less,
Nb: 0.001% or more and 0.300% or less,
V: 0.001% or more and 0.300% or less,
Zr: 0.001% or more and 0.300% or less,
Mo: 0.001% or more and 2.000% or less,
Cu: 0.001% or more and 2.000% or less,
Ni: 0.001% or more and 2.000% or less,
Sb: 0.001% or more and 0.100% or less,
Ca: 0.0001% or more and 0.0100% or less,
Mg: 0.0001% or more and 0.0100% or less, and
REM: 0.0001% or more and 0.1000% or less.

(4) The plated steel sheet for hot stamping according to any one of (1) to (3), wherein the average grain size is 40 nm or less.

(5) The plated steel sheet for hot stamping according to any one of (1) to (4), wherein a C concentration of the Zn—Ni plating layer is less than 1 mass %.

Advantageous Effects of Invention

According to the present invention, by making a large amount of Zn in the plating layer diffuse to the underlying steel sheet at the time of the heating in the hot stamping, and, further making the amount of diffusion of the Fe of the base metal steel sheet to the inside of the plating layer increase to make the Fe concentration in the plating layer increase, it is possible to raise the melting point of the plating layer and prevent the plating layer from becoming a liquid phase at the time of the shaping in the hot stamping and provide a plated steel sheet for hot stamping where LME does not occur. As a result, it becomes possible to obtain a hot stamped body with no LME cracks.

DESCRIPTION OF EMBODIMENTS

<Plated Steel Sheet for Hot Stamping>

The plated steel sheet for hot stamping according to the present invention comprises a steel sheet and a Zn—Ni plating layer formed on at least one surface of the steel sheet. Preferably, the Zn—Ni plating layer is formed on both surfaces of the steel sheet. Further, in the present invention, the Zn—Ni plating layer may be formed on the steel sheet or another plating layer may be provided between the steel sheet and the Zn—Ni plating layer.

[Steel Sheet]

The chemical composition of the steel sheet in the present invention is not particularly limited so long as the steel sheet can be used for hot stamping. Below, elements able to be contained in the steel sheet in the present invention will be explained. The "%" showing the contents of the elements in the chemical composition means mass % unless otherwise indicated.

Preferably, the steel sheet in the present invention can contain, by mass %, C: 0.05% or more and 0.70% or less, Mn: 0.5% or more and 11.0% or less, Si: 0.05% or more and 2.00% or less, Al: 0.001% or more and 1.500% or less, P: 0.100% or less, S: 0.100% or less, N: 0.010% or less, and O: 0.010% or less.

(C: 0.05% or More and 0.70% or Less)

C (carbon) is an element effective for improving the strength of the steel sheet. Automobile members for example, sometimes require high strengths of 980 MPa or more. To sufficiently secure strength, the C content is preferably 0.05% or more. On the other hand, if excessively containing C, sometimes the formability of the steel sheet falls, therefore the C content is preferably 0.70% or less. The lower limit of the C content is preferably 0.10%, more preferably 0.12%, still more preferably 0.15%, most preferably 0.20%. Further, the upper limit of the C content is preferably 0.65%, more preferably 0.60%, still more preferably 0.55%, most preferably 0.50%.

(Mn: 0.5% or More and 11.0% or Less)

Mn (manganese) is an element effective for improving the quenchability at the time of hot stamping. To reliably obtain this effect, the Mn content is preferably 0.5% or more. On the other hand, if excessively containing Mn, the Mn segregates and the strength, etc., of the body after hot stamping are liable to become uneven, therefore the Mn content is preferably 11.0% or less. The lower limit of the Mn content is preferably 1.0%, more preferably 2.0%, still more preferably 2.5%, even still more preferably 3.0%, most preferably 3.5%. The upper limit of the Mn content is preferably 10.0%, more preferably 9.5%, still more preferably 9.0%, even still more preferably 8.5%, most preferably 8.0%.

(Si: 0.05% or More and 2.00% or Less)

Si (silicon) is an element effective for improving the strength of the steel sheet. To sufficiently secure strength, the Si content is preferably 0.05% or more. On the other hand, if excessively containing Si, the formability sometimes falls, therefore the Si content is preferably 2.00% or less. The lower limit of the Si content is preferably 0.10%, more preferably 0.15%, still more preferably 0.20%, most preferably 0.30%. The upper limit of the Si content is preferably 1.80%, more preferably 1.50%, still more preferably 1.20%, most preferably 1.00%.

(Al: 0.001% or More and 1.500% or Less)

Al (aluminum) is an element acting as a deoxidizing element. To obtain the deoxidizing effect, the Al content is preferably 0.001% or more. On the other hand, if excessively containing Al, the formability is liable to fall, therefore the Al content is preferably 1.500% or less. The lower limit of the Al content is preferably 0.010%, more preferably 0.020%, still more preferably 0.050%, most preferably 0.100%. The upper limit of the Al content is preferably 1.000%, more preferably 0.800%, still more preferably 0.700%, most preferably 0.500%.

(P: 0.100% or Less)

(S: 0.100% or Less)

(N: 0.010% or Less)

(O: 0.010% or Less)

P (phosphorus), S (sulfur), N (nitrogen), and oxygen (O) are impurities and are preferably as low as possible, therefore lower limits of these elements are not particularly prescribed. However, the contents of these elements may be more than 0% or 0.001% or more. On the other hand, if excessively containing these elements, the toughness, ductility, and/or formability are liable to deteriorate, therefore the upper limits of P and S are preferably 0.100% and the upper limits of N and O are preferably 0.010%. The upper limits of P and S are preferably 0.080%, more preferably 0.050%. The upper limits of N and O are preferably 0.008%, more preferably 0.005%.

The basic chemical composition of the steel sheet in the present invention is as explained above. Furthermore, the steel sheet may, in accordance with need, contain at least one of the following optional elements in place of part of the balance of Fe. For example, the steel sheet may contain B: 0% or more and 0.0040% or less. Further, the steel sheet may contain Cr: 0% or more and 2.00% or less. Further, the steel sheet may contain at least one element selected from the group consisting of Ti: 0% or more and 0.300% or less, Nb: 0% or more and 0.300% or less, V: 0% or more and 0.300% or less, and Zr: 0% or more and 0.300% or less. Further, the steel sheet may contain at least one element selected from the group consisting of Mo: 0% or more and 2.000% or less, Cu: 0% or more and 2.000% or less, and Ni: 0% or more and 2.000% or less. Further, the steel sheet may contain Sb: 0% or more and 0.100% or less. Further, the steel sheet may contain at least one element selected from the group consisting of Ca: 0% or more and 0.0100% or less, Mg: 0% or more and 0.0100% or less, and REM: 0% or more and 0.1000% or less. Below, these optional elements will be explained in detail.

(B: 0% or More and 0.0040% or Less)

B (boron) is an element effective for improving the hardenability at the time of hot stamping. The B content may be 0%, but to reliably obtain this effect, the B content is preferably 0.0005% or more. On the other hand, if excessively containing B, the formability of the steel sheet is liable to fall, therefore the B content is preferably 0.0040% or less. The lower limit of the B content is preferably 0.0008%, more preferably 0.0010%, still more preferably 0.0015%. Further, the upper limit of the B content is preferably 0.0035%, more preferably 0.0030%.

(Cr: 0% or More and 2.00% or Less)

Cr (chromium) is an element effective for improving the hardenability at the time of hot stamping. The Cr content may be 0%, but to reliably obtain this effect, the Cr content is preferably 0.01% or more. The Cr content may be 0.10% or more, may be 0.50% or more, or may be 0.70% or more. On the other hand, if excessively containing Cr, the thermal stability of the steel material will sometimes fall. Therefore, the Cr content is preferably 2.00% or less. The Cr content may also be 1.50% or less, 1.20% or less, or 1.00% or less.

(Ti: 0% or More and 0.300% or Less)

(Nb: 0% or More and 0.300% or Less)

(V: 0% or More and 0.300% or Less)

(Zr: 0% or More and 0.300% or Less)

Ti (titanium), Nb (niobium), V (vanadium), and Zr (zirconium) are elements improving the tensile strength through refinement of the metal structure. The contents of these elements may be 0%, but to reliably obtain their effects, the Ti, Nb, V, and Zr contents are preferably 0.001% or more and may be 0.010% or more, 0.020% or more, or 0.030% or more. On the other hand, if excessively containing Ti, Nb, V, and Zr, the effects become saturated and the production costs rise. For this reason, the Ti, Nb, V, and Zr contents are preferably 0.300% or less and may be 0.150% or less, 0.100% or less, or 0.060% or less.

(Mo: 0% or More and 2.000% or Less)

(Cu: 0% or More and 2.000% or Less)

(Ni: 0% or More and 2.000% or Less)

Mo (molybdenum), Cu (copper), and Ni (nickel) have the actions of raising the tensile strength. The contents of these elements may be 0%, but to reliably obtain their effects, the Mo, Cu, and Ni contents are preferably 0.001% or more and may be 0.010% or more, 0.050% or more, or 0.100% or more. On the other hand, if excessively containing Mo, Cu, and Ni, the thermal stability of the steel material sometimes falls. Therefore, the Mo, Cu, and Ni contents are preferably 2.000% or less and may be 1.500% or less, 1.000% or less, or 0.800% or less.

(Sb: 0% or More and 0.100% or Less)

Sb (antimony) is an element effective for improving the wettability and adhesion of plating. The Sb content may also be 0%, but to reliably obtain this effect, the Sb content is preferably 0.001% or more. The Sb content may also be 0.005% or more, 0.010% or more, or 0.020% or less. On the other hand, if excessively containing Sb, sometimes a drop in the toughness is triggered. Therefore, the Sb content is preferably 0.100% or less. The Sb content may also be 0.080% or less, 0.060% or less, or 0.050% or less.

(Ca: 0% or More and 0.0100% or Less)

(Mg: 0% or More and 0.0100% or Less)

(REM: 0% or More and 0.1000% or Less)

Ca (calcium), Mg (magnesium), and REM (rare earth metals) are elements improving the toughness after hot stamping by adjusting the shapes of the inclusions. The contents of these elements may also be 0%, but to reliably obtain their effects, the Ca, Mg, and REM contents are preferably 0.0001% or more and may be 0.0010% or more, 0.0020% or more, or 0.0040% or more. On the other hand, if excessively containing Ca, Mg, and REM, the effects become saturated and the production costs rise. For this reason, the Ca and Mg contents are preferably 0.0100% or less and may be 0.0080% or less, 0.0060% or less, or 0.0050% or less. Similarly, the REM content is preferably 0.1000% or less and may be 0.0800% or less, 0.0500% or less, or 0.0100% or less.

The balance other than the above elements consists of iron and impurities. Here, the "impurities" include constituents entering during various factors in the production process such as the ore, scrap, or other raw materials when industrially producing the base metal steel sheet and not intentionally added to the base metal steel sheet according to the embodiments of the present invention. Further, the "impurities" include elements which are other than the constituents explained above and which are contained in the base metal steel sheet at a level where the actions and effects unique to the elements do not affect the properties of the hot dip galvanized steel sheet according to the embodiments of the present invention.

The steel sheet in the present invention is not particularly limited. Hot rolled steel sheet, cold rolled steel sheet, and other general steel sheet can be used. Further, the steel sheet in the present invention may be any thickness so long as enabling formation of the later explained Zn—Ni plating layer on the steel sheet and the hot stamping. For example, it may be 0.1 to 3.2 mm.

[Zn—Ni Plating Layer]

The Zn—Ni plating layer in the present invention is a plating layer containing at least Zn and Ni. The other constituents are not particularly limited. For example, the Zn—Ni plating layer may be a plating layer having Zn as a main constituent (i.e., having a Zn concentration of 50 mass % or more) and having an Ni concentration of 8 mass % or more with the other constituents being not particularly limited. In that plating layer, the Zn and Ni are present with Ni dissolved in the Zn or with an intermetallic compound being formed by Zn and Ni. That plating layer may be formed by any plating method, but, for example, is preferably formed by electroplating. The Zn—Ni plating layer is formed on at least one surface of the steel sheet, preferably is formed on both surfaces of the steel sheet. Naturally, if hot stamping, Fe, etc., diffuse from the underlying steel sheet to the plating layer or Zn, etc., diffuse from the plating layer to the underlying steel sheet, therefore the chemical composition of the plating layer changes after the hot stamping in accordance with the heating conditions at the time of hot stamping (heating temperature, holding time, etc.)

(Ni Concentration)

In the Zn—Ni plating layer in the present invention, the lower limit of the Ni concentration is 8 mass %. By making the Ni concentration 8 mass % or more, after the heating at the time of the hot stamping causes the Zn to diffuse to the steel sheet, it is possible to make the Ni concentration of the Zn—Ni plating layer sufficiently higher compared with the Zn concentration and obtain a plating layer having a sufficiently high melting point. Due to this, at the time of the shaping in the hot stamping, the plating layer will not become a liquid phase and LME can be suppressed. If the Ni concentration becomes less than 8 mass %, even if Zn diffuses to the steel sheet, the Zn concentration in the plating layer cannot be sufficiently reduced compared with the Ni concentration, therefore the melting point of the plating layer cannot be sufficiently raised and LME is liable to occur at the time of the shaping in the hot stamping. For example, the lower limit of the Ni concentration is preferably 10 mass %, more preferably 12 mass %.

The upper limit of the Ni concentration is not particularly limited but from the viewpoint of economy is preferably 30 mass % or less. For example, the upper limit of the Ni concentration may be 28 mass %, 25 mass %, or 20 mass %.

(C Concentration)

In the present invention, the C concentration in the Zn—Ni plating layer is preferably less than 1 mass %. By reducing the C concentration in the Zn—Ni plating layer to less than 1 mass %, it is possible to raise the adhesion of the plating layer with respect to the steel sheet. On the other hand, if the C concentration exceeds 1 mass %, at the time of heating in the hot stamping, the plating layer will become brittle and the plating will easily peel off at the steel sheet after hot stamping. Therefore, from the viewpoint of raising the adhesion of the plating layer, the lower the C concentration, the better. The concentration may be 0.8 mass % or less, 0.5 mass % or less, 0.1 mass % or less, 0.01 mass % or less, or 0%. For example, by using a plating bath not containing any organic additive to form the Zn—Ni plating layer, it is possible to reliably reduce the C concentration in that Zn—Ni plating layer to 0.1 mass % or less or 0.01 mass % or less.

The Zn—Ni plating layer in the present invention may further contain one or two or more of Fe, Cr, and Co. These elements may be intentionally added or may unavoidably enter in production. Further, the balance of the chemical composition of the Zn—Ni plating layer is Zn and impurities. In a specific embodiment of the present invention, the Zn—Ni plating layer contains, by mass %, Ni: 8% or more and 30% or less, one or two or more of Fe, Cr, and Co: 0% or more and 5% or less, and C: less than 1% and has a balance of iron and impurities. Preferably, the Zn—Ni plating layer contains, by mass %, Ni: 8% or more and 30% or less and has a balance of iron and impurities. The "impurities" in the Zn—Ni plating layer mean constituents, etc., entering due to various factors in the production process such as the raw materials when producing the Zn—Ni plating layer.

(Amount of Plating Deposition)

In the Zn—Ni plating layer in the present invention, the lower limit of the amount of plating deposition per surface of the steel sheet is 10 g/m$^2$. By making the amount of plating deposition per surface 10 g/m$^2$ or more, it is possible to sufficiently prevent the formation of surface scale at the time of the heating in the hot stamping. If the amount of plating deposition per surface becomes less than 10 g/m$^2$, the thickness of the Zn—Ni plating layer will become insufficient, surface scale will be formed at the time of the heating in the hot stamping, and it will become necessary to remove the scale by shot blasting before coating. The lower limit of the amount of plating deposition per surface of the steel sheet is preferably 16 g/m$^2$, more preferably 20 g/m$^2$, still more preferably 24 g/m$^2$, most preferably 30 g/m$^2$.

The upper limit of the amount of plating deposition per surface of the steel sheet is 90 g/m$^2$. By making the amount of plating deposition per surface 90 g/m$^2$ or less, the plating layer will not become excessively thick, therefore at the time of the heating in the hot stamping, the Zn in the plating layer will easily diffuse into the steel sheet and as a result at the time of the shaping in the hot stamping, the melting point of the plating layer can be sufficiently raised and LME can be effectively prevented. If the amount of plating deposition per surface becomes more than 90 g/$m^2$, the plating layer becomes too thick, the Zn will not sufficiently proceed to diffuse to the steel sheet, and, as a result, at the time of the shaping in the hot stamping, the plating layer can become a liquid phase, therefore LME is liable to become harder to suppress. Further, the amount of plating deposition being excessive is not preferable from the viewpoint of economy. The upper limit of the amount of plating deposition per surface of the steel sheet is preferably 80 g/$m^2$, more preferably 76 g/$m^2$, still more preferably 70 g/$m^2$, most preferably 60 g/$m^2$.

The Ni concentration of the Zn—Ni plating layer and the amount of plating deposition in the present invention are measured by induction coupled plasma (ICP) spectroscopy. Specifically, the amount of plating deposition in the present invention is found by dissolving the plating layer from the plated steel sheet having the Zn—Ni plating layer by 10% HCl and analyzing the obtained solution by ICP. The amount of plating deposition in the present invention is the amount per surface, therefore if a Zn—Ni plating layer is formed at both surfaces of the steel sheet, the amounts of plating deposition of the two surfaces are calculated as being the same. Further, the C concentration in the Zn—Ni plating layer in the present invention is measured by the high frequency combustion-infrared absorption method.

(Average Grain Size)

In the Zn—Ni plating layer of the present invention, the upper limit of the average grain size of the Zn—Ni plating is 50 nm. By making the average grain size 50 nm or less, at the time of the heating in the hot stamping, the Zn in the Zn—Ni plating layer is easy to transfer whereby the Zn easily diffuses into the steel sheet. This diffusion can occur not only when the Zn becomes a liquid phase, but also in a solid phase. If the Zn in the Zn—Ni plating layer diffuses, the Ni concentration in that plating layer becomes relatively higher compared with the Zn concentration and the melting point of the plating layer is raised. Further, by making the average grain size of the plating layer 50 nm or less, diffusion of the Fe of the base metal steel sheet to the plating layer is also promoted. The melting point of the plating layer rises due to the rise of the Fe concentration in the plating layer as well. For this reason, at the time of the shaping in the hot stamping, it becomes difficult for the plating layer to remain in the liquid phase and the occurrence of LME can be suppressed. In particular, if the hot stamping was performed at a high temperature, with rapid heating, and/or with no holding time, LME becomes easier to occur, but by making the average grain size of the plating finer like in the present invention, at the time of the heating in the hot stamping, Zn will diffuse in the steel sheet and the melting point of the plating layer will rise, therefore at the time of the shaping in the host stamping, the plating layer will not melt. Further, the Zn which diffused at the time of heating forms a solid solution with the Fe in the steel sheet, therefore as a result, LME can be suppressed even under the above such conditions where LME can readily occur. If the average grain size becomes more than 50 nm, the Zn will not sufficiently proceed to diffuse to the steel sheet, the melting point of the plating layer cannot be sufficiently high, and LME is liable to be unable to be suppressed. The upper limit of the average grain size of the plating is preferably 45 nm, more preferably 40 nm, still more preferably 35 nm, most preferably 30 nm.

The lower limit of the average grain size of the plating is not particularly limited, but the lower limit of the average grain size which can be practically produced is 10 nm, therefore the lower limit may be 10 nm. The lower limit of the average grain size of the plating is preferably 12 nm, more preferably 15 nm, still more preferably 18 nm, most preferably 20 nm.

The average grain size of the Zn—Ni plating is measured by X-ray diffraction (XRD). Specifically, the full width at half maximum B of the diffraction peak measured by XRD using Co-Kα rays (tube voltage: 40 kV and tube current: 200 mA) is used to find it by the following Scherrer equation:

$$\text{Average grain size (nm)} = K\lambda/B\cos\theta \quad (1)$$

(where K: Scherrer constant, λ: Co-Kα ray wavelength (nm), and θ is the Bragg angle (radian)). K is a value which changes according to the shape of the crystallites, but in the present invention, K may be 0.9.

As explained above, in the present invention, the average grain size of the Zn—Ni plating is 50 nm or less. Such a fine grain Zn—Ni plating can, for example, be obtained by electroplating by a high current density (typically 300 A/$dm^2$ or more).

The above such plated steel sheet having the Zn—Ni plating layer on the steel surface can be used for hot stamping under any conditions known to persons skilled in the art. The heating system of the hot stamping is not limited, but, for example, furnace heating, ohmic heating, induction heating, etc., may be mentioned. Further, the heating temperature at the time of hot stamping may be any temperature so long as heating the steel sheet to the austenite region in accordance with the chemical composition of the steel sheet and is, for example, 800° C. or more, 850° C. or more, 900° C. or more, or 950° C. or more. The plated steel sheet can be heated to the austenite region by the above such heating system, then shaped by the press dies and quenched. After heating, the steel sheet may be cooled after holding it at that temperature for 1 to 10 minutes or need not be held nor cooled. Further, the quenching (cooling) can be performed by a cooling rate of 1 to 100° C./s.

If using the plated steel sheet for hot stamping according to the present invention, at the time of the heating in the hot stamping, it is possible to make the Zn in the Zn—Ni plating layer diffuse to the steel sheet to raise the melting point of the plating layer at the time of the shaping in the hot stamping, therefore, at the time of the shaping in the hot stamping, the plating layer will not become a liquid phase and, further, the Zn which diffused to the steel sheet at the time of heating dissolves in the Fe in the steel sheet whereby no matter what the above-mentioned conditions, in particular conditions where LME easily occurs (high temperature, rapid heating, and/or no holding time), no LME will occur and therefore a hot stamped body with no LME cracks can be obtained.

[Method of Production of Plated Steel Sheet for Hot Stamping]

An example of the method of production of the plated steel sheet for hot stamping according to the present invention will be explained below. The plated steel sheet for hot stamping according to the present invention can be obtained by forming a Zn—Ni plating layer on at least one surface of a steel sheet, preferably both surfaces, by for example electroplating.

(Production of Steel Sheet)

The method of production of the steel sheet used for producing the plated steel sheet for hot stamping according to the present invention is not particularly limited. For example, it is possible to adjust the chemical composition of the molten steel to the desired ranges and hot roll, coil, and cold roll the steel to thereby obtain a steel sheet. The thickness of the steel sheet in the present invention may, for example, be 0.1 mm to 3.2 mm.

The chemical composition of the steel sheet used is not particularly limited, but, as explained above, the steel sheet preferably contains, by mass %, C: 0.05% or more and 0.70% or less, Mn: 0.5% or more and 11.0% or less, Si: 0.05% or more and 2.00% or less, Al: 0.001% or more and 1.500% or less, P: 0.100% or less, S: 0.100% or less, N: 0.010% or less, and O: 0.010% or less and has a balance of iron and impurities. Further, the steel sheet may further contain, by mass %, at least one selected from the group consisting B: 0.0005% or more and 0.0040% or less, Cr: 0.01% or more and 2.00% or less, Ti: 0.001% or more and 0.300% or less, Nb: 0.001% or more and 0.300% or less, V: 0.001% or more and 0.300% or less, Zr: 0.001% or more and 0.300% or less, Mo: 0.001% or more and 2.000% or less, Cu: 0.001% or more and 2.000% or less, Ni: 0.001% or more and 2.000% or less, Sb: 0.001% or more and 0.100% or less, Ca: 0.0001% or more and 0.0100% or less, Mg: 0.0001% or more and 0.0100% or less, and REM: 0.0001% or more and 0.1000% or less.

(Formation of Zn—Ni Plating Layer)

The method for formation of the Zn—Ni plating layer in the present invention is not particularly limited so long as the Ni concentration, amount of plating deposition, and average grain size according to the present invention are obtained, but electroplating can be used to form it. In particular, to obtain a fine grain Zn—Ni plating, it is preferable to perform the electroplating by a high current density, for example, it is possible to perform electroplating by 280 A/dm$^2$ or more, 300 A/dm$^2$ or more, or 350 A/dm$^2$ or more. In particular, if performing electroplating by 350 A/dm$^2$ or more, it becomes possible to obtain an average grain size of 40 nm or less. The reason why the average grain size of the plating becomes finer if plating by a high current density is believed to be that the speed of formation of precipitation nuclei rapidly increases proportionally to an exponential function of the overcurrent—which becomes higher due to the higher current density. With a relatively low current density (for example, about 100 A/dm$^2$), it is not possible to obtain a plating average grain size of 50 nm or less like in the present invention. Further, the composition of the bath used for forming the Zn—Ni plating layer may, for example, but nickel sulfate-hexahydrate: 150 to 350 g/liter, zinc sulfate-heptahydrate: 10 to 150 g/liter, and sodium sulfate: 25 to 75 g/liter. By making such a bath composition, electroplating by the above-mentioned high current density becomes possible and a fine average grain size can be obtained.

On the other hand, in general, if performing electroplating by a high current density, plating burns which may cause poor appearance and/or poor adhesion will readily occur. For this reason, to use a high current density while preventing plating burns, the pH of the plating bath may be 2.0 or less, preferably 1.5 or less, more preferably 1.0 or less, for example using sulfuric acid and, further, the temperature of the plating bath may be 60° C. or more, preferably 65° C. or more, more preferably 70° C. or more. With the above such bath composition, bath pH, and bath temperature, even with a high current density, it is possible to form a Zn—Ni plating layer without causing plating burns. Further, from the viewpoint of prevention of plating burns, the upper limit of the current density is preferably 400 A/dm$^2$ or 450 A/dm$^2$.

If using electroplating to produce the plated steel sheet for hot stamping according to the present invention, it is possible to suitably change the current density, bath composition, and conduction time at the time of the electroplating so as to adjust the Ni concentration of the Zn—Ni plating layer, the amount of plating deposition, and the average grain size. More specifically, the Ni concentration can be adjusted by changing the current density and bath composition, the amount of plating deposition by the current density and conduction time, and the grain size by the current density.

For example, to improve the various properties of the plating layer, sometimes dextrin, a diallylamine polymer, a diallyldialkyl ammonium salt polymer, or other organic additive is added to the plating bath. As the diallylamine polymer, for example, a diallylamine hydrochloride polymer, methyldiallylamine hydrochloride polymer, diallylamine hydrochloride-sulfur dioxide copolymer, etc., may be mentioned, while as the diallyldialkyl ammonium salt polymer, for example, a diallyldimethyl ammonium chloride polymer, diallylmethylethyl ammonium ethylsulfate polymer, etc., may be mentioned. However, in electroplating by a plating bath to which such an organic additive is added, sometimes the carbon constituent contained in the additive causes the plating layer to become brittle at the time of the heating in the hot stamping and causes peeling of the plating at the steel sheet after the hot stamping. Therefore, from the viewpoint of raising the adhesion of the plating layer, the C concentration in the Zn—Ni plating layer, for example, has to be reduced to less than 1 mass %, preferably 0.01 mass % or less. For this reason, the above electroplating is preferably performed using an additive-free plating bath.

EXAMPLES

The plated steel sheet for hot stamping according to the present invention will be explained in more detail below while giving several examples. However, it is not intended that the scope of the invention described in the claims be limited by the specific examples explained below.

[Preparation of Samples of Plated Steel Sheet for Hot Stamping]

A thickness 1.4 mm cold rolled steel sheet was dipped in a plating bath having the following plating bath composition and electroplated to form a Zn—Ni plating layer on both surfaces of that cold rolled steel sheet to obtain Sample Nos. 1 to 10 of the plated steel sheet for hot stamping. All of the steel sheets used contained, by mass %, C: 0.50%, Mn: 3.0%, Si: 0.50%, Al: 0.100%, P: 0.010%, S: 0.020%, N: 0.003%, O: 0.003%, and B: 0.0010% and had a balance of iron and impurities.

Plating Bath Composition

- nickel sulfate hexahydrate: 250 g/liter (fixed)
- zinc sulfate heptahydrate: 10 to 150 g/liter (variable)
- sodium sulfate: 50 g/liter (fixed)
- organic additive: none, dextrin (3 g/liter), or diallylamine hydrochloride-sulfur dioxide copolymer (molecular weight 5000, 3 g/liter)

To prevent plating burns, the pH of the plating bath was 1.0 using sulfuric acid, and the bath temperature was maintained at 70° C. The current density and the conduction time were adjusted to obtain the desired amount of deposition of Zn—Ni plating and average grain size. Further, to obtain the desired Ni concentration, the concentration of the zinc sulfate-heptahydrate was suitably adjusted based on the set current density. The current densities set for producing the samples are shown in Table 1.

The Ni concentrations and the amounts of plating deposition per surface of the Sample Nos. 1 to 10 obtained by the electroplating performed under the above conditions were determined by ICP analysis. Specifically, 10% HCl was used to dissolve just the plating layers from the samples and the obtained solutions were analyzed by ICP to find the Ni concentrations and the amounts of plating deposition per surface. The Ni concentrations and the amounts of plating deposition per surface of the samples are shown in Table 1.

The average grain size of the Zn—Ni plating was determined by XRD. First, the XRD of each sample using Co-Kα rays (tube voltage: 40 kV and tube current: 200 mA) was used to find the full width at half maximum B of the diffraction peak. Further, using the found full width at half maximum B, the following Scherrer equation:

$$\text{Average grain size (nm)} = K\lambda/B \cos \theta \quad (1)$$

was used to calculate the average grain size (where K: Scherrer constant=0.9, λ: Co-Kα ray wavelength (nm), and θ is the Bragg angle (radian)). Here, the Co-Kα ray wavelength λ=0.179 nm and the Bragg angle θ was the angle of the diffraction line recognized in the range of 50.1 to 50.3°. The average grain sizes of the samples are shown in Table 1.

examination of the five locations were evaluated as "good in crack evaluation" while cases where cracks were observed in even one location were evaluated as "poor in crack evaluation".

[Evaluation of Plating Adhesion]

The plating adhesion was evaluated by applying tape to the above V-bent part, then peeling it off and determining the area rate of the plating layer adhered to the peeled off tape. For the tape, Cellotape® CT-18 made by Nichiban Co., Ltd. was used and was adhered in a direction vertical to the V-bending direction. The tape was vigorously rubbed by a rubber stopper to make it sufficiently adhere, then was pulled off in the vertical direction. The evaluation range was a center 10 mm of the sample in the longitudinal direction of the tape and a width of 5 mm centered about the V-bent head part in the width direction of the tape. The results of evaluation of the samples are shown in Table 1.

TABLE 1

Properties of Plated Steel Sheet for Hot Stamping and Results of Evaluation

| Sample no. | Additive | Current density (A/dm$^2$) | Zn—Ni plating layer ||||| Crack evaluation | Plating adhesion evaluation | Remarks |
| | | | Ni conc. (mass %) | C conc. (mass %) | Deposition (per surface) (g/m$^2$) | Average grain size (nm) | | | |
| --- | --- | --- | --- | --- | --- | --- | --- | --- | --- |
| 1 | None | 350 | 12 | Analysis lower limit or less | 10 | 28 | Good | 5 | Ex. |
| 2 | None | 350 | 12 | Analysis lower limit or less | 30 | 27 | Good | 5 | Ex. |
| 3 | None | 350 | 12 | Analysis lower limit or less | 60 | 28 | Good | 10 | Ex. |
| 4 | None | 350 | 12 | Analysis lower limit or less | 90 | 28 | Good | 15 | Ex. |
| 5 | None | 350 | 12 | Analysis lower limit or less | 150 | 29 | Poor | 20 | Comp. ex. |
| 6 | None | 100 | 12 | Analysis lower limit or less | 60 | 100 | Poor | 15 | Comp. ex. |
| 7 | None | 300 | 12 | Analysis lower limit or less | 60 | 48 | Good | 15 | Ex. |
| 8 | None | 350 | 10 | Analysis lower limit or less | 60 | 34 | Good | 10 | Ex. |
| 9 | None | 350 | 25 | Analysis lower limit or less | 60 | 25 | Good | 10 | Ex. |
| 10 | None | 350 | 5 | Analysis lower limit or less | 60 | 45 | Poor | 10 | Comp. ex. |
| 11 | Dextrin (3 g/liter) | 100 | 12 | 1 | 60 | 26 | Good | 60 | Ex. |
| 12 | Diallylamine hydrochloride-sulfur dioxide copolymer (3 g/liter) | 100 | 12 | 3 | 60 | 21 | Good | 70 | Ex. |

The C concentration in the Zn—Ni plating layer was measured using a high frequency combustion-infrared absorption apparatus CS-6000 made by LECO Corporation.

[Evaluation of Plated Steel Sheet for Hot Stamping]
[Evaluation of LME Resistance]

Sample Nos. 1 to 10 of the plated steel sheet for hot stamping obtained as explained above were hot stamped. The hot stamping was performed by raising the samples in temperature to 950° C. by ohmic heating then immediately, without holding, shaping and quenching (cooling rate: 50° C./s) them using tip R: 3 mm V-bending dies. The V-bent parts of the obtained hot stamped bodies were buried in epoxy resin and polished then the cross-sections were examined by an optical microscope. The examination was conducted at 250× magnification at positions of five locations randomly selected from the surroundings of the V-bent head parts. Cases where no cracks at all were observed in the In Sample Nos. 1 to 4, 7 to 9, 11, and 12 of the plated steel sheet for hot stamping according to the present invention, no cracks occurred in the hot stamped body and it was learned that LME could be sufficiently suppressed. In particular, in Sample Nos. 1 to 4 and 7 to 9, the C concentration in the Zn—Ni plating layer was the analysis lower limit or less (less than 0.01 mass %). In relation to this, a high plating adhesion could be achieved.

In Sample No. 5, an LME crack occurred at the hot stamped body. This is believed to be due to the fact that the amount of plating deposition was excessive and the Zn—Ni plating layer was thick, therefore at the time of the heating in the hot stamping, Zn was unable to sufficiently diffuse to the steel sheet.

In Sample No. 6, an LME crack occurred at the hot stamped body. This is believed to be due to the fact that the current density at the time of the electroplating was low and the average grain size of the plating became large, therefore at the time of the heating in the hot stamping, Zn was unable to sufficiently diffuse to the steel sheet.

In Sample No. 10, an LME crack occurred after the hot stamping. This is believed to be due to the fact that Zn diffused to the steel sheet at the time of the heating in the hot stamping, but the initial Ni concentration of the sample was low and the melting point of the Zn—Ni plating layer after diffusion could not be sufficiently raised.

In Sample Nos. 11 and 12, LME could be sufficiently suppressed, but the adhesion of the plating was low. A large amount of plating adhered to the peeled off tape. The area rate was more than 50%. This is believed to be due to the fact that an organic additive was used for the plating bath and therefore the C concentration in the Zn—Ni plating layer became higher and the plating layer became brittle at the time of the heating in the hot stamping.

INDUSTRIAL APPLICABILITY

According to the present invention, it is possible to provide plated steel sheet for hot stamping able to suppress LME and prevent LME cracks of a hot stamped body and there by possible to provide a high strength member for automobile use. Therefore, the present invention can be said to be an invention with an extremely high value in industry.

The invention claimed is:

1. A plated steel sheet for hot stamping comprising a steel sheet and a Zn—Ni plating layer formed on at least one surface of the steel sheet, wherein the Zn—Ni plating layer has an Ni concentration of 8 mass % or more, a Zn concentration of 50 mass % or more, a plating deposition amount of 30 g/m$^2$ or more and 90 g/m$^2$ or less per surface, and an average grain size of the Zn—Ni plating of 50 nm or less.

2. The plated steel sheet for hot stamping according to claim 1, wherein the steel sheet comprises, by mass %, C: 0.05% or more and 0.70% or less,
Mn: 0.5% or more and 11.0% or less,
Si: 0.05% or more and 2.00% or less,
Al: 0.001% or more and 1.500% or less,
P: greater than 0% to 0.100% or less,
S: greater than 0% to 0.100% or less,
N: greater than 0% to 0.010% or less,
O: greater than 0% to 0.010% or less,
B: 0% or more and 0.0040% or less,
Cr: 0% or more and 2.00% or less,
Ti: 0% or more and 0.300% or less,
Nb: 0% or more and 0.300% or less,
V: 0% or more and 0.300% or less,
Zr: 0% or more and 0.300% or less,
Mo: 0% or more and 2.000% or less,
Cu: 0% or more and 2.000% or less,
Ni: 0% or more and 2.000% or less,
Sb: 0% or more and 0.100% or less,
Ca: 0% or more and 0.0100% or less,
Mg: 0% or more and 0.0100% or less,
REM: 0% or more and 0.1000% or less, and
a balance of iron and impurities.

3. The plated steel sheet for hot stamping according to claim 2, wherein the steel sheet comprises, by mass %, at least one selected from the group consisting of B: 0.0005% or more and 0.0040% or less,
Cr: 0.01% or more and 2.00% or less,
Ti: 0.001% or more and 0.300% or less,
Nb: 0.001% or more and 0.300% or less,
V: 0.001% or more and 0.300% or less,
Zr: 0.001% or more and 0.300% or less,
Mo: 0.001% or more and 2.000% or less,
Cu: 0.001% or more and 2.000% or less,
Ni: 0.001% or more and 2.000% or less,
Sb: 0.001% or more and 0.100% or less,
Ca: 0.0001% or more and 0.0100% or less,
Mg: 0.0001% or more and 0.0100% or less, and
REM: 0.0001% or more and 0.1000% or less.

4. The plated steel sheet for hot stamping according to claim 1, wherein the average grain size is 40 nm or less.

5. The plated steel sheet for hot stamping according to claim 1, wherein a C concentration of the Zn—Ni plating layer is less than 1 mass %.

* * * * *